(12) United States Patent
Bialer et al.

(10) Patent No.: US 11,231,482 B2
(45) Date of Patent: Jan. 25, 2022

(54) GENERATE OVERLAPPING CHIRP TRANSMISSIONS WITH A SINGLE CHIRP GENERATOR

(71) Applicant: GM Global Technology Operations LLC, Detroit, MI (US)

(72) Inventors: Oded Bialer, Petah Tivak (IL); David Shapiro, Netanya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 295 days.

(21) Appl. No.: 16/504,974

(22) Filed: Jul. 8, 2019

(65) Prior Publication Data

US 2021/0011119 A1    Jan. 14, 2021

(51) Int. Cl.
*G01S 13/93* (2020.01)
*G01S 7/35* (2006.01)
*G01S 13/931* (2020.01)

(52) U.S. Cl.
CPC ............. *G01S 7/35* (2013.01); *G01S 13/931* (2013.01)

(58) Field of Classification Search
CPC ...... G01S 13/343; G01S 13/42; G01S 13/931; G01S 7/35
See application file for complete search history.

(56) References Cited

U.S. PATENT DOCUMENTS

| | | | | |
|---|---|---|---|---|
| 5,181,037 | A * | 1/1993 | Komatsu | G01S 7/023 342/70 |
| 10,775,479 | B2 * | 9/2020 | Jonas | G01S 13/931 |
| 2014/0197983 | A1 * | 7/2014 | Reuter | G01S 13/343 342/200 |
| 2016/0178392 | A1 * | 6/2016 | Goldfain | G16H 40/67 702/104 |
| 2017/0248692 | A1 * | 8/2017 | Zivkovic | G01S 13/42 |
| 2019/0056478 | A1 * | 2/2019 | Millar | H04B 1/69 |
| 2020/0184161 | A1 * | 6/2020 | Pettus | G01S 7/025 |

* cited by examiner

*Primary Examiner* — Timothy A Brainard
(74) *Attorney, Agent, or Firm* — Cantor Colburn LLP

(57) ABSTRACT

A radar system includes a signal generator to generate a linear frequency modulated continuous wave signal as a base chirp, and one or more frequency shifters to generate respective one or more additional chirps from the base chirp. The radar system also includes two or more switches. One of the two or more switches obtains a portion of the base chirp as a base transmit signal, and remaining ones of the two or more switches respectively obtain a portion of each of the one or more additional chirps as one or more additional transmit signals for transmission by the radar system. At least a portion of the base transmit signal and the one or more additional transmit signals overlaps in time.

20 Claims, 5 Drawing Sheets

GENERATE OVERLAPPING CHIRP TRANSMISSIONS WITH A SINGLE CHIRP GENERATOR

INTRODUCTION

The subject disclosure relates to generating overlapping chirp transmissions with a single chirp generator.

Vehicles (e.g., automobiles, trucks, construction equipment, farm equipment, automated factory equipment) increasingly include sensors to obtain information about the vehicle and its environment. Semi-autonomous operational systems (e.g., collision avoidance, adaptive cruise control, automated braking) or autonomous operation of the vehicle is facilitated by the sensors. Exemplary sensors include radio detection and ranging (radar) systems, light detection and ranging (lidar) systems, and cameras. A multiple input multiple output (MIMO) radar system includes multiple transmitters and multiple receivers. A MIMO radar system that transmits a linear frequency modulated continuous wave (LFMCW) signal, also known as a chirp, may be used. A MIMO radar system increases angular resolution over a single transmitter and receiver radar system. However, because every receiver receives the reflections resulting from every transmitter, the received reflections must be separated. Overlapping chirps may be transmitted by different transmitters to increase detection range and decrease Doppler (range rate) ambiguity. However, prior overlapping chirps entail the use of multiple chirp generators. Accordingly, it is desirable to generate overlapping chirp transmissions with a single chirp generator.

SUMMARY

In one exemplary embodiment, a radar system includes a signal generator to generate a linear frequency modulated continuous wave signal as a base chirp, and one or more frequency shifters to generate respective one or more additional chirps from the base chirp. The radar system also includes two or more switches, one of the two or more switches obtaining a portion of the base chirp as a base transmit signal, and remaining ones of the two or more switches respectively obtaining a portion of each of the one or more additional chirps as one or more additional transmit signals for transmission by the radar system. At least a portion of the base transmit signal and the one or more additional transmit signals overlaps in time.

In addition to one or more of the features described herein, each of the one or more frequency shifters shifts a frequency of the base chirp by a different amount that is at least a minimum frequency fd.

In addition to one or more of the features described herein, the minimum frequency fd is given by:

$$fd > \left(\frac{BW}{T}\right) * \text{delay},$$

where
BW is the bandwidth, T is a duration of the base chirp, and the delay refers to a roundtrip time for the base transmit signal to reach a maximum detection range and return as a reflected signal.

In addition to one or more of the features described herein, a slope of the base chirp and a slope of each of the one or more additional chirps is a same value.

In addition to one or more of the features described herein, the two or more switches are hardware switches.

In addition to one or more of the features described herein, each of the two or more switches is closed for a duration corresponding with a duration of the baseband transmit signal.

In addition to one or more of the features described herein, the radar system includes two or more nodes, the two or more nodes respectively generating the base transmit signal and the one or more additional transmit signals, and each of the two or more nodes being implemented as an integrated circuit and coupled to one or more transmit antennas and one or more receive antennas.

In addition to one or more of the features described herein, only one of the two or more nodes includes the signal generator configured to generate the base chirp.

In addition to one or more of the features described herein, each of the two or more nodes includes a respective one of the two or more switches implemented in software.

In addition to one or more of the features described herein, the radar system is disposed in a vehicle, and an operation of the vehicle is controlled based on information from the radar system.

In another exemplary embodiment, a method includes disposing a signal generator to generate a linear frequency modulated continuous wave signal as a base chirp of a radar system. The method also includes arranging one or more frequency shifters to generate respective one or more additional chirps from the base chirp, and configuring a base switch to obtain a portion of the base chirp as a base transmit signal and one or more additional switches to respectively obtain a portion of each of the one or more additional chirps as one or more additional transmit signals for transmission by the radar system. At least a portion of the base transmit signal and the one or more additional transmit signals overlap in time.

In addition to one or more of the features described herein, the method also includes implementing the base switch and the one or more additional switches in hardware and configuring the base switch and the one or more additional switches to be closed for a same duration.

In addition to one or more of the features described herein, the method also includes fabricating two or more integrated circuits. The two or more integrated circuits respectively generate the base transmit signal and the one or more additional transmit signals and each of the two or more integrated circuits is coupled to one or more transmit antennas and one or more receive antennas.

In addition to one or more of the features described herein, the disposing the signal generator includes disposing the signal generator as part of only one of the two or more integrated circuits.

In addition to one or more of the features described herein, the method also includes implementing the base switch and the one or more additional switches in software in respective ones of the two or more integrated circuits.

In another exemplary embodiment, a method includes generating, using a chirp generator, a linear frequency modulated continuous wave signal as a base chirp of a radar system, and generating, using one or more frequency shifters and the base chirp, respective one or more additional chirps. The method also includes controlling a base switch to obtain a portion of the base chirp as a base transmit signal and one or more additional switches to respectively obtain a portion of each of the one or more additional chirps as one or more additional transmit signals for transmission by the radar system. At least a portion of the base transmit signal and the one or more additional transmit signals overlap in time.

In addition to one or more of the features described herein, the controlling the base switch and the one or more additional switches includes closing the base switch and the one or more additional switches for a same duration, equal to a duration of the base transmit signal and the one or more additional transmit signals.

In addition to one or more of the features described herein, the controlling the base switch and the one or more additional switches is in software.

In addition to one or more of the features described herein, the radar system is disposed in a vehicle.

In addition to one or more of the features described herein, the method also includes controlling an operation of the vehicle based on information from the radar system.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
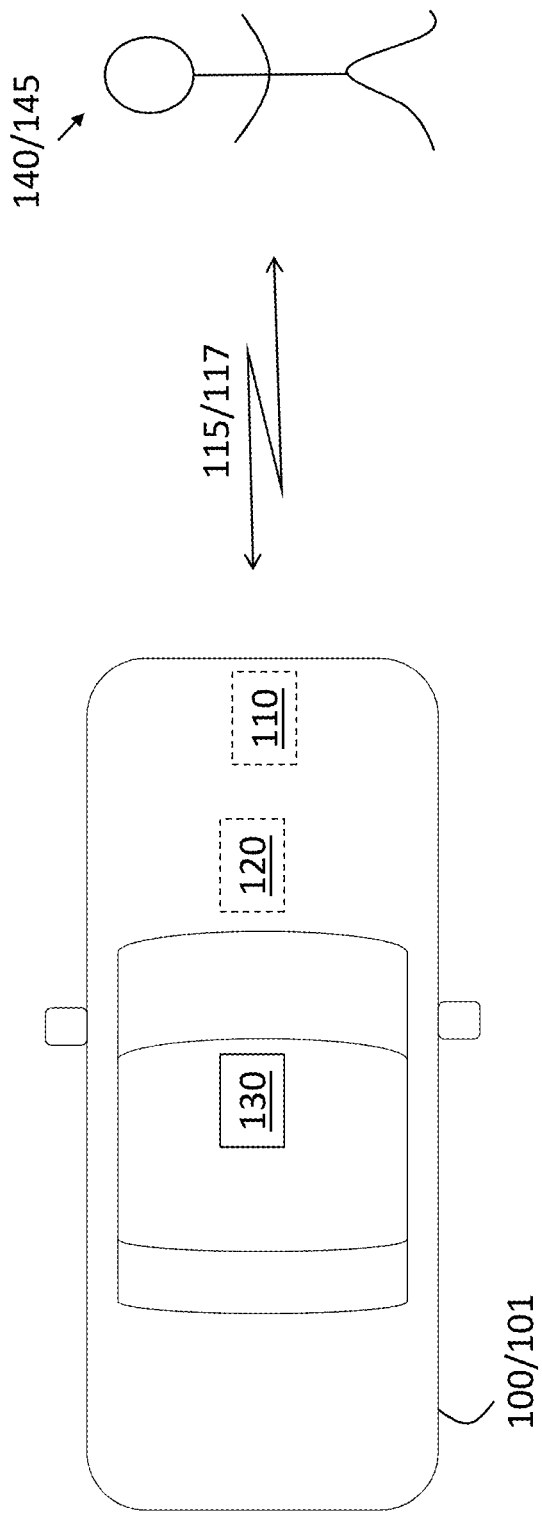
FIG. 1 is a block diagram of a vehicle with a radar system that generates overlapping chirp transmissions with a single chirp generator according to one or more embodiments.

The following description is merely exemplary in nature and is not intended to limit the present disclosure, its application or uses. It should be understood that throughout the drawings, corresponding reference numerals indicate like or corresponding parts and features.

As previously noted, the transmission of overlapping chirps in a MIMO radar system may increase detection range and decrease Doppler ambiguity. Typically, overlapping chirps are generated using multiple chirp generators. This can be impractical. Embodiments of the systems and methods detailed herein relate to generating overlapping chirp transmissions with a single chirp generator. The single chirp generator generates a base chirp. Then, a frequency shifter and switching scheme are used to generate an overlapping chirp.

In accordance with an exemplary embodiment, FIG. 1 is a block diagram of a vehicle 100 with a radar system 110 that generates overlapping chirp transmissions with a single chirp generator. The exemplary vehicle 100 is an automobile 101. The vehicle 100 may include one or more other sensors 130 (e.g., camera, lidar system) in addition to the radar system 110. The sensors 130 may be used separately or in conjunction with the radar system 110 to detect objects 140 such as the pedestrian 145 shown in FIG. 1. The vehicle 100 also includes a controller 120. Processing of data obtained by the radar system 110 may be performed within the radar system 110 or by the controller 120 using processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. A combination of the radar system 110 and controller 120 may be used to process the data. The controller 120 may control operation of the vehicle 100 (e.g., autonomous driving, semi-autonomous driving such as collision avoidance, automatic braking, adaptive cruise control) based on the detection of objects 140. Aspects of the radar system 110 are further detailed with reference to FIGS. 2 and 4.

Figure 2:
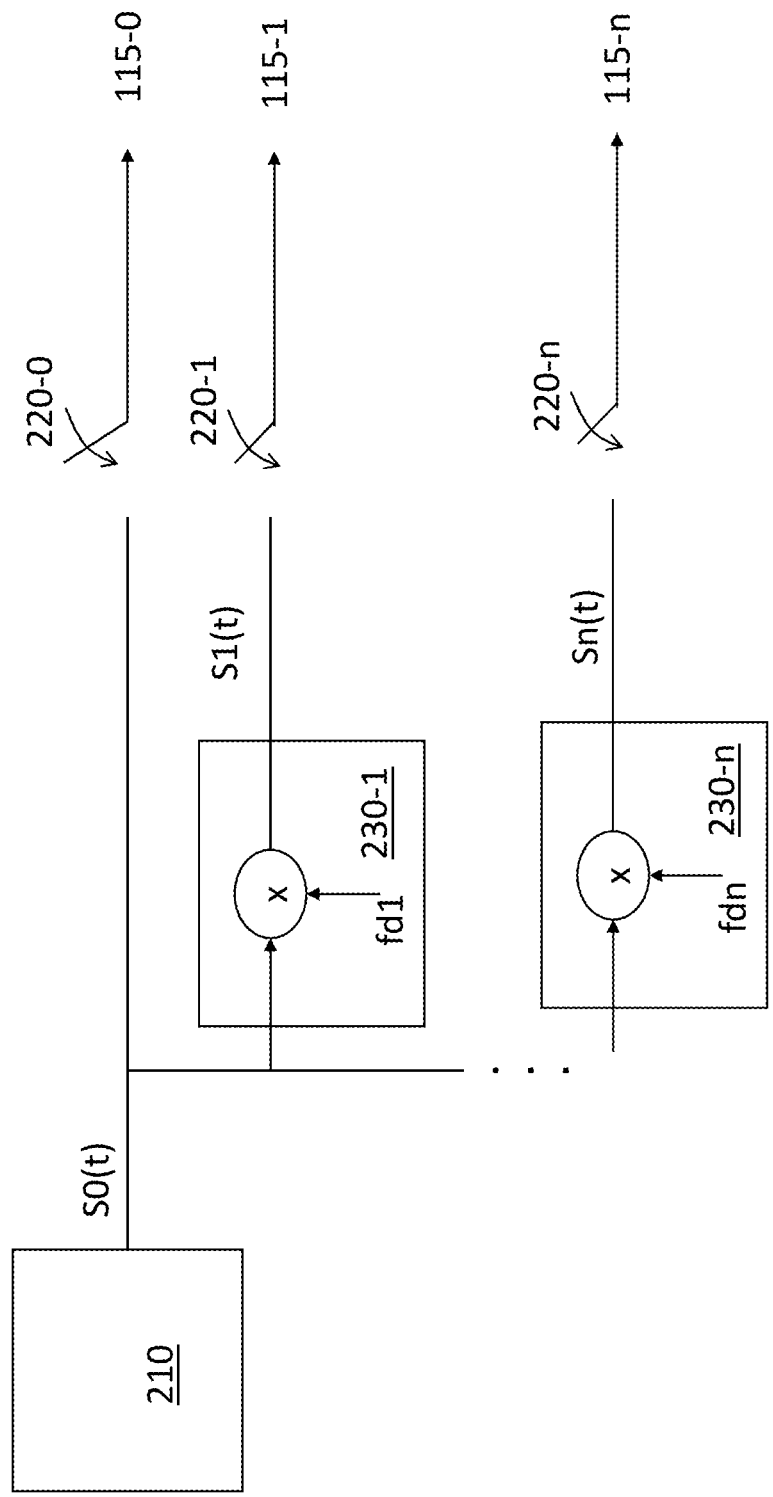
FIG. 2 is a block diagram of aspects of a MIMO radar system involved in generating overlapping chirp transmissions with a single chirp generator according to one or more exemplary embodiments.

FIG. 2 is a block diagram of aspects of a MIMO radar system 110 involved in generating overlapping chirp transmissions with a single chirp generator according to one or more exemplary embodiments. FIG. 2 shows a single chirp generator 210 that produces a chirp $S0(t)$. The chirp generator 210 is any signal generator that facilitates the linear increase or decrease in frequencies that defines the chirp $S0(t)$. The output of the chirp generator 210, chirp $S0(t)$, may be considered a base chirp $S0(t)$ because every other chirp $S1(t)$ through $Sn(t)$ is generated from the base chirp $S0(t)$. The chirp $S0(t)$ may be split into any number of paths for transmission as transmit signals 115-0 through 115-$n$ that overlap in time, as discussed further with reference to FIG. 3. All the paths include a switch 220-0 through 220-$n$ (generally referred to as 220) that controls the chirp duration T of the respective transmitted signal 115.

All but the first path also includes a frequency shifter 230-1 through 230-$n$ (generally referred to as 230). In each path, the frequency shifter shifts the frequencies of the chirp $S0(t)$ by respective frequencies fd1 through fdn (generally referred to as fd) to result in respective shifted chirps $S1(t)$ through $Sn(t)$ with respective frequencies that are up or down converted from the frequencies of $S0(t)$. The frequency shift amount fd is given by:

$$fd > \left(\frac{BW}{T}\right) * \text{delay} \qquad [\text{EQ. 1}]$$

The bandwidth (BW) divided by the chirp duration T provides the slope of the chirp $S0(t)$, which is also the slope of chirps $S1(t)$ through $Sn(t)$. The delay refers to the maximum expected return delay, which is the time for the transmit signal 115 to reach an object 140 at the maximum detectable range and return as the reflected signal 117 (i.e., the roundtrip time).

Figure 3:
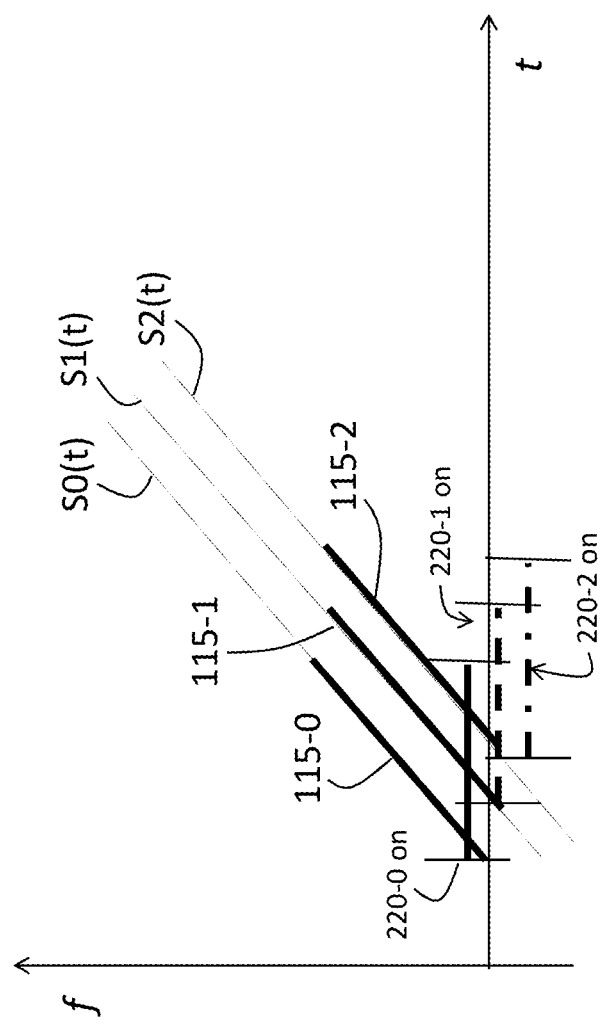
FIG. 3 illustrates switching scheme used to generate an overlapping chirp using a single chirp generator according to one or more embodiments.

The linearly increasing or decreasing frequencies in the chirp $S0(t)$ are shifted up or down by a different amount (fd or greater) in each of the paths to generate signals $S1(t)$ through $Sn(t)$. As illustrated in FIG. 3, the result of the arrangement shown in FIG. 2 is the transmission of chirps (i.e., transmit signals 115) that at least partially overlap in time. The discussion with reference to FIG. 5 details the processing of reflected signals 117 obtained with these temporally overlapping transmit signals 115.

FIG. 3 illustrates the switching scheme used to generate overlapping chirps $S0(t)$, $S1(t)$, $S2(t)$ using a single chirp generator 210 (FIG. 2) according to one or more embodiments. Time t is shown along one axis, and frequency f is shown along a perpendicular axis. Three exemplary transmit signals 115-0, 115-1, 115-2 are shown. These three transmit signals 115 do not coincide entirely but do overlap in time. The transmit signal 115-0 is a portion of the chirp S0(t) that is generated by the chirp generator 210. The operation of the switch 220-0 (FIG. 2) determines which portion of the chirp S0(t) makes up the transmit signal 115-0. The period for which the switch 220-0 is on is shown in FIG. 3 along with the resulting portion of chirp S0(t) that is the transmit signal 115-0.

In the exemplary case shown in FIG. 3, the chirp S0(t) is down converted (i.e., frequency shifted to a lower frequency) to generate chirps S1(t) and S2(t). That is, at any given time t, the frequency of chirp S 1(t) is lower than the frequency of chirp S0(t) and the frequency of chirp S2(t) is lower than the frequencies of both chirps S0(t) and S1(t). The slope at which the frequencies increase linearly in each of the chirps S0(t), S1(t), and S2(t) is the same. The periods for which the switches 220-1 and 220-2 are on is indicated in FIG. 3. The period for which the switch 220-1 is on is used to control the portion of the chirp S1(t) that is used as the transmit signal 115-1, and the period for which the switch 220-2 is on is used to control the portion of the chirp S2(t) that is used as the transmit signal 115-2. As FIG. 3 indicates, the overlaps in the periods when switches 220-0, 220-1, and 220-2 are on correspond with the periods when the transmit signals 115-0, 115-1, and 115-2 overlap. While the chirp S0(t) is generated by the chirp generator 210, the chirps S1(t) and S2(t) are derived from chirp S0(t) and do not require additional chirp generators 210.

Figure 4:
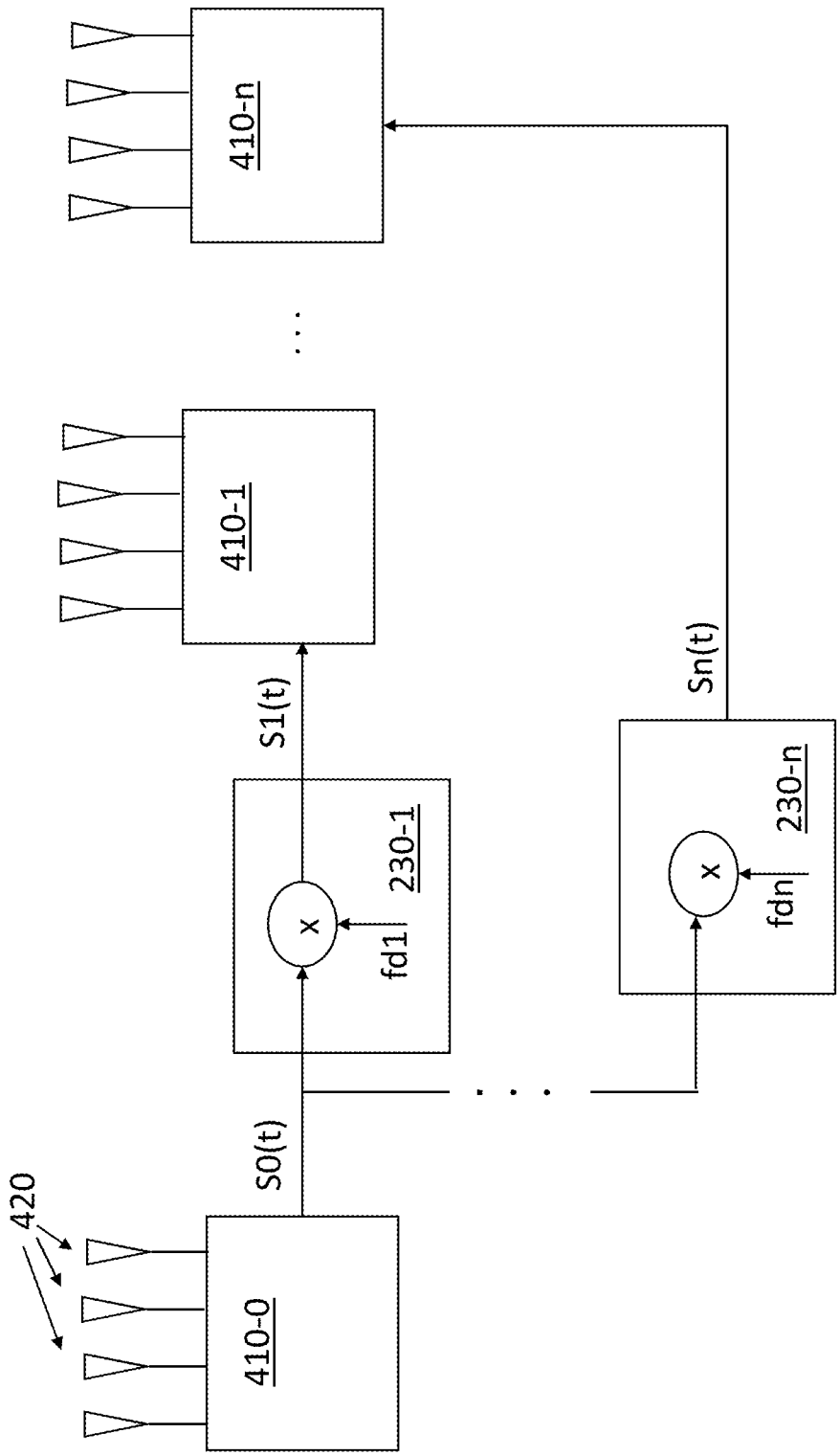
FIG. 4. is a block diagram of aspects of a MIMO radar system involved in generating overlapping chirp transmissions with a single chirp generator according to one or more other exemplary embodiments.

FIG. 4 is a block diagram of aspects of a MIMO radar system 110 involved in generating overlapping chirp transmissions with a single chirp generator according to one or more other embodiments. According to the embodiment shown in FIG. 4, the radar system 110 includes multiple nodes implemented as integrated circuits (i.e., chips). RF chips 410-0 through 410-n (generally referred to as 410) are shown. The value of n may be 1 or more. Each node or RF chip 410 includes transmit and receive antennas 420. For example, the exemplary RF chips 410 shown in FIG. 4 each includes two transmit and two receive antennas 420. The RF chip 410-0 is the only one that includes functionality of the chirp generator 210 (FIG. 2) implemented as part of the RF chip 410-0 and generates a chirp S0(t). A portion of the chirp S0(t) is obtained as transmit signal 115-0 based on a software-implemented switch within the RF chip 410-0 that serves the function discussed for switch 220-0 (FIG. 2).

Figure 5:
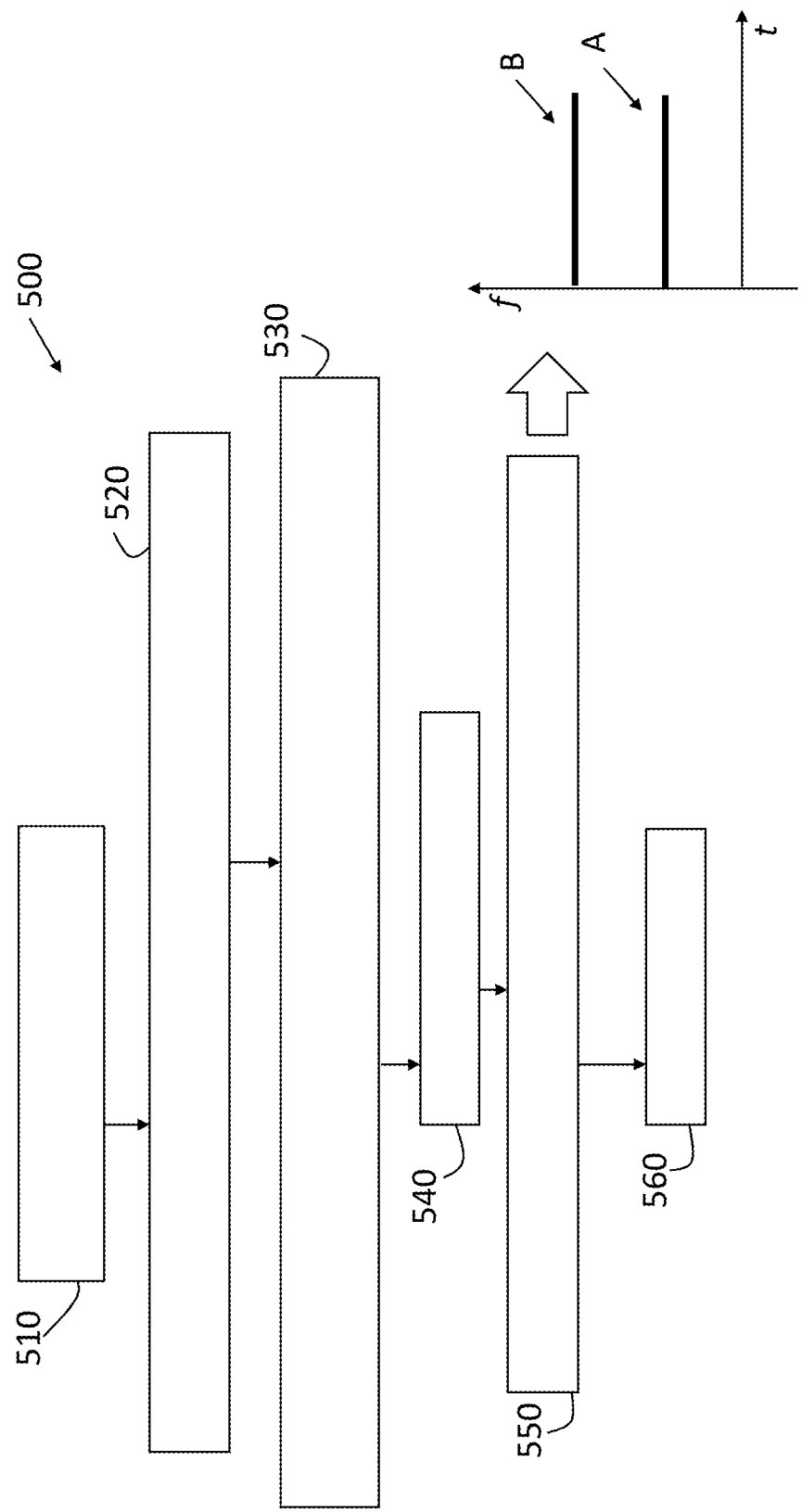
FIG. 5 shows the process flow of a method involving overlapping chirp transmissions generated with a single chirp generator according to one or more embodiments.

Additional frequency-shifted chirps S1(t) through S2(t) are obtained by processing that chirp S0(t). That is, as discussed with reference to FIG. 2 and shown in FIG. 3, frequency shifters 230-1 through 230-n shift the linearly varying frequencies of chirp S0(t) by a given frequency fd1 through fdn (generally fd) such that the slope is maintained but the frequency at any given time t is higher or lower than that of chirp S0(t). Switches are implemented in software in RF chips 410-1 through 410-n to respectively obtain a subset of chirps S1(t) through Sn(t) as transmit signals 115-1 through 115-n. The transmit signals 115-0 through 115-n overlap at least partially in time. FIG. 5 indicates the result of processing the reflected signals 117 obtained based on the overlapping transmit signals 115-0 through 115-n.

FIG. 5 shows the process flow of a method 500 involving overlapping chirp transmissions generated with a single chirp generator 210 (FIG. 2) according to one or more embodiments. At block 510, generating the base chirp S0(t) is with the only chirp generator 210, which may be part of an RF chip 410-0, according to an exemplary embodiment. At block 520, generating one or more frequency shifted chirps S1(t) through Sn(t) entails using a respective frequency shifter 230-1 through 230-n. At block 530, operating switches 220 to generate transmit signals 115 from the base chirp S0(t) and frequency shifted chirps S1(t) through Sn(t) may be according to the embodiment shown in FIG. 2 or FIG. 4, for example. That is, the switches 220 may be part of each RF chip 410-1 through 410-n according to an exemplary embodiment.

After the transmit signals 115 are transmitted, the method 500 includes receiving reflected signals 117 (FIG. 1), at block 540. The reflected signals 117-0 through 117-n that are received based on the transmit signals 115-0 through 115-n are correlated with one or more transmit signals 115 at block 550. A received reflected signal 117 is a sum of the reflections resulting from transmitted portions of chirps S0(t) through Sn(t). Generally, the reflected signal 117 is correlated with the base chirp S0(t) but another chirp among those used to generate the transmit signals 115-1 through 115-n may be used instead. In the exemplary case of two transmitted signals 115 (i.e., transmitted portions of chirps S0(t) and S1(t)), the reflected signal r(t) may be expressed as:

$$r(t)=S0(t-Td)+S1(t-Td) \quad [EQ.\ 2]$$

Td is the delay to a reflection point of an object 140. The correlation, at block 550, provides:

$$S0(t)*r(t)=S0(t)*S0(t-Td)+S0(t)*S1(t-Td) \quad [EQ.\ 3]$$

In FIG. 5, $S0(t)*S0(t-Td)$ is shown as A, and $S0(t)*S1(t-Td)$ is shown as B. A multiplication of two signals that are delayed relative to each other is a single-frequency signal (e.g., sine) with a frequency proportional to the relative delay. Because S1(t) is frequency shifted from S0(t), the delay between S0(t) and S1(t−Td) (i.e., B) is larger than the delay between S0(t) and S0(t−Td) (i.e., A). This is reflected in FIG. 5. B is at a higher frequency $f$ over time t than A.

At block 560, processing the result of the correlation performed at block 550 may include performing a fast Fourier transform (FFT) and additional known processes to obtain the range, Doppler (range rate), and angle to each object 140 detected through the processing. Because the transmit signals 115 are at least partially overlapping, the total energy transmitted over a given period (e.g., 10 milliseconds) is higher than without the overlap. This higher transmit power results in a higher detection range. Further, because Doppler (i.e., range rate) ambiguity decreases as the period between transmissions decreases, the overlapping transmit signals 115 result in a decrease in Doppler ambiguity relative to transmitting in turn.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A radar system, comprising:
a signal generator configured to generate a linear frequency modulated continuous wave signal as a base chirp;

one or more frequency shifters configured to generate respective one or more additional chirps from the base chirp;

two or more switches, one of the two or more switches configured to obtain a portion of the base chirp as a base transmit signal, and remaining ones of the two or more switches configured to respectively obtain a portion of each of the one or more additional chirps as one or more additional transmit signals for transmission by the radar system, wherein each of the base chirp and the one or more additional chirps has a same frequency range and at least a portion of the base transmit signal and the one or more additional transmit signals overlaps in time.

2. The radar system according to claim 1, wherein each of the one or more frequency shifters shifts a frequency of the base chirp by a different amount that is at least a minimum frequency fd.

3. The radar system according to claim 2, wherein the minimum frequency fd is given by:

$$fd > \left(\frac{BW}{T}\right) * \text{delay},$$

where
BW is the bandwidth, T is a duration of the base chirp, and the delay refers to a roundtrip time for the base transmit signal to reach a maximum detection range and return as a reflected signal.

4. The radar system according to claim 2, wherein a slope of the base chirp and a slope of each of the one or more additional chirps is a same value.

5. The radar system according to claim 1, wherein the two or more switches are hardware switches.

6. The radar system according to claim 5, wherein each of the two or more switches is closed for a duration corresponding with a duration of the baseband transmit signal.

7. The radar system according to claim 1, wherein the radar system includes two or more nodes, the two or more nodes respectively generating the base transmit signal and the one or more additional transmit signals, and each of the two or more nodes being implemented as an integrated circuit and coupled to one or more transmit antennas and one or more receive antennas.

8. The radar system according to claim 7, wherein only one of the two or more nodes includes the signal generator configured to generate the base chirp.

9. The radar system according to claim 7, wherein each of the two or more nodes includes a respective one of the two or more switches implemented in software.

10. The radar system according to claim 1, wherein the radar system is disposed in a vehicle, and an operation of the vehicle is controlled based on information from the radar system.

11. A method, comprising:
disposing a signal generator configured to generate a linear frequency modulated continuous wave signal as a base chirp of a radar system;
arranging one or more frequency shifters to generate respective one or more additional chirps from the base chirp;
configuring a base switch to obtain a portion of the base chirp as a base transmit signal and one or more additional switches to respectively obtain a portion of each of the one or more additional chirps as one or more additional transmit signals for transmission by the radar system, wherein each of the base chirp and the one or more additional chirps has a same frequency range and at least a portion of the base transmit signal and the one or more additional transmit signals overlap in time.

12. The method according to claim 11, further comprising implementing the base switch and the one or more additional switches in hardware and configuring the base switch and the one or more additional switches to be closed for a same duration.

13. The method according to claim 11, further comprising fabricating two or more integrated circuits, wherein the two or more integrated circuits respectively generate the base transmit signal and the one or more additional transmit signals and each of the two or more integrated circuits is coupled to one or more transmit antennas and one or more receive antennas.

14. The method according to claim 13, wherein the disposing the signal generator includes disposing the signal generator as part of only one of the two or more integrated circuits.

15. The method according to claim 13, further comprising implementing the base switch and the one or more additional switches in software in respective ones of the two or more integrated circuits.

16. A method, comprising:
generating, using a chirp generator, a linear frequency modulated continuous wave signal as a base chirp of a radar system;
generating, using one or more frequency shifters and the base chirp, respective one or more additional chirps;
controlling a base switch to obtain a portion of the base chirp as a base transmit signal and one or more additional switches to respectively obtain a portion of each of the one or more additional chirps as one or more additional transmit signals for transmission by the radar system, wherein each of the base chirp and the one or more additional chirps has a same frequency range and at least a portion of the base transmit signal and the one or more additional transmit signals overlap in time.

17. The method according to claim 16, wherein the controlling the base switch and the one or more additional switches includes closing the base switch and the one or more additional switches for a same duration, equal to a duration of the base transmit signal and the one or more additional transmit signals.

18. The method according to claim 16, wherein the controlling the base switch and the one or more additional switches is in software.

19. The method according to claim 16, wherein the radar system is disposed in a vehicle.

20. The method according to claim 19, further comprising controlling an operation of the vehicle based on information from the radar system.

* * * * *